United States Patent [19]

Bjork

[11] 4,179,596
[45] Dec. 18, 1979

[54] METHOD FOR PROCESSING FIBEROPTIC ELECTRONIC COMPONENTS OF ELECTRONIC VACUUM DEVICES

[75] Inventor: Lennart W. Bjork, Palo Alto, Calif.

[73] Assignee: Litton Systems, Inc., San Carlos, Calif.

[21] Appl. No.: 900,716

[22] Filed: Apr. 27, 1978

[51] Int. Cl.$^2$ .............................................. C03B 37/10
[52] U.S. Cl. ................................ 219/10.55 M; 65/2
[58] Field of Search ................ 316/17, 18, 30; 65/32, 65/DIG. 4, 2; 219/10.55 M

[56] References Cited

U.S. PATENT DOCUMENTS

| | | | |
|---|---|---|---|
| 3,224,851 | 12/1965 | Hicks, Jr. ................................ | 65/32 |
| 3,870,497 | 3/1975 | Spiessens .......................... | 65/DIG. 4 |
| 4,086,075 | 4/1978 | Ekkelboom et al. ............ | 65/DIG. 4 |
| 4,090,055 | 5/1978 | King .................................. | 65/DIG. 4 |

*Primary Examiner*—John McQuade
*Attorney, Agent, or Firm*—Norman E. Brunell; Walter R. Thiel

[57] ABSTRACT

In the method of manufacturing an electronic vacuum device of the type containing at least one component element comprising a matrix of solid or hollow glass fibers bonded together in a fused matrix, in which device at least one end of said matrix is located within or forms a boundary to a region in-vacuum, including the step of applying microwave energy radiation to said glass matrix for removing water vapor and other gas molecules from said matrix.

1 Claim, 1 Drawing Figure

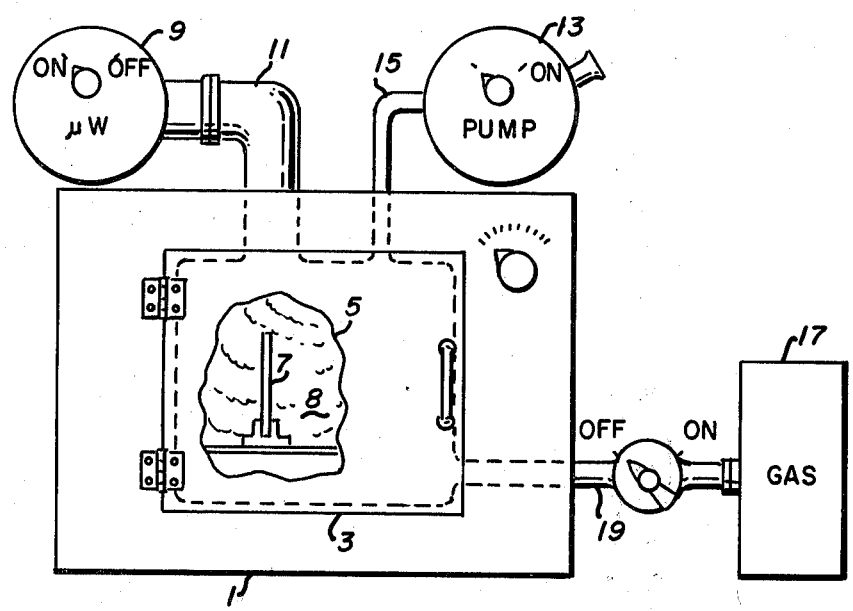

METHOD FOR PROCESSING FIBEROPTIC ELECTRONIC COMPONENTS OF ELECTRONIC VACUUM DEVICES

BACKGROUND OF THE INVENTION

The present invention relates in the manufacture of electronic vacuum devices to a method of treating fused glass structures, particularly fused glass fiber elements intended for use as a component element of an electronic vacuum device, such as a cathode ray tube or image intensifier tube to provide enhanced physical characteristics. More particularly, my invention relates to the treatment of fiberoptic type faceplates and microchannel plates formed from fused-together fiberoptic glass materials to enhance performance and reliability of the electronic vacuum devices into which they are assembled.

A fiberoptic faceplate is manufactured form a plurality of individual glass fibers which are stacked together, pressed and heated under pressure to form a uniform structure with a plurality of light transmitting passages so as to be optically transparent between front and back surfaces. Typically, in order to minimize optical "crosstalk" between the individual glass fibers in the structure, ensuring that the light entering one end of a fiber exits the opposed end and is not diffused or substantially coupled to other adjacent fibers, a coating of light absorbing material is placed on or adjacent the individual fibers or bundle of fibres prior to fusing them together. This coating usually contains material, such as iron oxide particles and carbon particles, dispersed in an adherent suspension or matrix. the aforedescribed structure is known and is typical of the kinds of faceplates employed as the output display in electronic vacuum tube devices, such as those commonly termed "night vision devices" or "image intensifiers". As the output display a phosphor coating is applied to one surface of the faceplate, much like the phosphor coated faceplate of a cathode ray tube found in television sets, so as to cause fluorescence under electron bombardment.

A problem occurs in such a fused fiberoptic structure whenever water vapor or other gases are present in the light absorbing material or are captured in the minute interstices between individual fibers in the plate. Those undesired impurity ingredients create an electrical leakage path between the front and back surfaces of the fiberoptic faceplate, a path through which direct electrical current can flow and a high leakage is undesirable. For example, a low-voltage battery powered power supply is provided in a night vision device to provide the voltages and currents necessary to the operation of the device, the exact circuit details of which are not pertinent to the present invention. Hence, any leakage path between the front and back surfaces of the faceplate is a factor which must be considered by the designer of the power supply for the device since the leakage path poses a power drain on the supply. Not only is battery power in this way wasted, but more importantly it has been found that the leakage resistance may change with time, such as to decrease and drain more current and this detracts from the function of the other elements of the circuit by changing voltages inasmuch as the power supply is intended to supply very minute currents on the order of 200 milliamps at high voltages into a high resistance load. A secondary problem occurs when the extraneous water vapor and active gas molecules migrate from the interstices of the faceplate into the vacuum region of the vacuum device, creating some amount of adverse chemical reaction, termed "poisoning," of electron emitting surfaces, employed as an element therein as is known, thereby reducing device life. From this standpoint the elimination of water vapor and gases from the faceplate prior to assembly into the night vision device is an objective which previously has been sought to be accomplished by the application of high voltage across the plates and under such conditions "aging" the plate, the results of which are not to my satisfaction.

One object of my invention therefore is to remove water vapor and other gases from the interstices between glass fibers in a fiberoptic plate, as well as to stabilize the leakage resistance of the plate.

A related component element of a night vision device is the microchannel plate, a known electron "multiplying" element which is formed of a fused bundle of hollow glass tubes arranged in a uniform structure defining a surface having on the order of one million minute passages per square inch of surface area. The mircochannel plate is formed originally from a fused bundle of fiberoptic fibers, as was the aforedescribed faceplate. The glass composition of the microchannel plate is such that when the passage walls are chemically treated by prior art processing techniques, including firing in a wet hydrogen atmosphere at high temperatures, the passage walls attain an electron secondary emission ratio greater than unity and a subcutaneous semiconductive layer, which structure is known in the prior art. An unfortunate undesired side-effect of such processing to obtain the desired secondary emission characteristics rendering it useful as an electron multiplying element is that the process creates a diffusion of hydrogen gas molecules into the glass and by-products of water vapor, hydroxyls, carbon monoxide, nitrogen and free hydrogen, all of which are trapped within the bulk of the glass, and are extremely difficult to remove by normal thermal outgassing techniques, such as heating. As a result, the ultimate life of the vacuum device containing the microchannel plate is in part determined by the diffusion or permeation of such trapped gasses to the active photocathode surface causing localized poisoning of the photocathode material.

Accordingly, another object of my invention is to eliminate extraneous gas and water vapor from a microchannel plate structure.

SUMMARY OF THE INVENTION

The foregoing objects are accomplished according to the invention by a treatment process which includes the step of exposing the fiberoptic plates or the microchannel plates to microwave energy radiation, preferably in that frequency range known as the S-band defined as between 2000 and 4000 megahertz. That radiation exposure should be for an interval empirically determined to maximize removal of the undesired impurities. A preferred apparatus for accomplishing the invention includes an enclosure or chamber within which to receive the fused-glass fiber element to be treated, a source of microwave energy connected to said chamber for introducing microwave energy therein to expose the element to microwave radiation, a pump connected to said chamber for evacuating gases from said chamber, and a source of chemically inert gas connected to said chamber.

The foregoing objects and advantages of my invention, as well as the structure and steps characterizing same, briefly summarized above, are better understood by making reference to a preferred embodiment of the method and apparatus invention symbolically illustrated in the FIGURE of the drawing, considered in connection with the detailed description which follows in this specification.

DESCRIPTION OF THE PREFERRED EMBODIMENTS

A preferred embodiment illustrated in the FIGURE includes an enclosure 1, which contains a door 3, to define an enclosed metal walled chamber 8 within which, as represented by the cutaway portion 5, is placed a fiberoptic faceplate 7 for treatment. A microwave energy source 9, symbolically illustrated and suitably of S-band frequency at 600 to 650 watts input, has its output coupled into the chamber via a waveguide passage 11 or equivalent means. Additionally, a vacuum pump 13 is connected via a passage 15 to the enclosed chamber 8. A source of inactive gas 17, such as nitrogen or the like, is connected via a passage 19 also to chamber 8. Each of the elements is of any conventional structure. The microwave energy source 9 is preferably fitted within the confines of housing or enclosure 1 and may be a standard commercial or industrial microwave oven which is modified in accordance with the principles of the preferred apparatus for practicing my method to incorporate the additional elements. Door 3 when closed renders the chamber vacuum impervious as well as microwave energy impervious. The pipe passage 19 connecting the chamber to the gas cylinder 17 is also vacuum tight so that gas is not bled out of source 17 or from the ambient environment during operation of vacuum pump 13.

In one specific example of the practice of my invention a fiberoptic faceplate 7 is supported within the chamber 8 and the source of microwave energy 9 is operated to thereby introduce S-band microwave energy into the chamber 8 and expose or subject the faceplate to the effects of this energy. By way of example, the microwave source may be a standard 650 watt source providing energy at 2450 megahertz and the chamber may comprise any standard commercial dimension with suitable means for storing or otherwise rendering the heating effects of the microwave energy homogeneous with time. And by way of specific example, exposure for a period of 30 to 60 minutes is believed sufficient for a faceplate of dimension of 1.25 inches diameter by one-quarter inch thick.

By subjecting the fiberoptic plates to microwave energy the heating is in effect localized to those particular areas containing moisture and to the light absorbing material, the carbon and iron oxide mixture, within the glass matrix, which are absorptive of microwave energy, and not the glass, which is relatively unabsorptive of microwave energy, a familiar characteristic of most galss or ceramic material known to those owning microwave ovens. The heating tends to drive the water vapor and loosely held gas molecules out of the fiberoptic plate and the result is an increase in the face to face electrical resistance and a characteristic electrical leakage resistance more stable with time or "aging" than fiberoptic faceplates processed by conventional prior art methods. The treatment is extremely selective and there is no damage to the faceplate, such as the warping, heating or diffusion of the light absorbant glass, as could be caused by thermal treatment methods.

In a further example, the foregoing process is repeated but in this case the vacuum pump 13 is operated to evacuate the chamber of the gases originally present as well as the gas molecules and water vapor which are driven off during treatment, so as to minimize the possibility that any of the gases will be returned or re-introduced into the faceplate. As a still further refinement to the foregoing process, and by way of additional example, the preceding example is modified further so that subsequent to the simultaneous application of microwave energy treatment by source 9 and vacuum pumping by pump 13, the valve associated with gas container 17 is operated to the "on" position to introduce the inactive gas via pipe 19 into chamber 8. This gas is of a type which will not react with the faceplate in a deleterious way and will tend to displace any other gases remaining in the chamber. Moreover, this gas is relatively harmless to individuals so that after pressure is equalized within and without the chamber the door may be opened and an operator, though exposed to the inert gas, is not harmed. A further alternative is to simply pump out the inert gas and thereafter re-introduce air into the chamber.

I do not believe that the time element in the foregoing treatment to be critical and expect that a treatment of 30 minutes in each of the above examples is adequate. It is recognized that continued exposure beyond any particular time selected or determined empirically from actual experience to be optimal for any particular faceplate would serve no purpose but on the other hand would not injure the faceplate unless the degree of heating became so great that transfer of this heat to the glass results in detachment or diffusion. That possibility is highly unlikely to occur in most available microwave ovens since the microwave power is not that large.

The foregoing process is repeated with a microchannel plate substituted for the fiberoptic faceplate 7 in each of the preceding examples. It is found that the glass surfaces chemically converted during the hydrogen firing process to possess secondary emission characteristics and a subcutaneous electrically semiconductive layer is inherently less absorptive to microwave energy than the water vapor captured within the device. Accordingly, heating through exposure to microwave radiation is localized on the walls of the minute passages within the hollow glass rods containing the water vapor, the hydroxyls, carbon monoxide, nitrogen free hydrogen, and any other contaminant gas molecules which are vaporized and driven off.

I am familiar with the existence of microwave ovens and of their purposes in exposing foodstuffs and other edibles to microwave radiation therein for the purposes of heating and cooking those substances, and I am also aware of the prior knowledge in microwave cooking that glass containers within which the food to be cooked is placed are essentially non-absorptive of microwave energy and tend to remain cool during microwave cooking of the food, except for that heat which is passed to the glass utensil through thermal conduction from the hot food. Although that knowledge serves as obvious inspiration to my treatment method, it is not believed to suggest a method of treatment of a glass article or matrix comprising a fused glass element for the purpose of stabilizing the electrical leakage characteristics between the front and back surfaces thereof as a step in the process of manufacturing an electrical vacuum device, such as a night vision tube or cathode ray tube, containing an element formed of a fused bundle of solid or hollow glass fibers. It is seen that the foregoing method provides a simple very efficient and low cost method for processing microchannel plates before they have final electrodes supplied, as well as stabilizing the resistance of the faceplates and extending the lives of the devices of which they form component elements.

It is believed that the foregoing description of the preferred embodiments of my inventions in a method and in an apparatus is presented in sufficient detail as to enable one skilled in the art to make and use the apparatus and practice the method without undue experimentation. However, the details presented for that purpose are not intended to restrict or limit my invention inasmuch as equivalent elements or additional elements or steps may be substituted in the method and in the apparatus as becomes apparent to those skilled in the art upon reading this specification, all of which embody my invention. Accordingly it is expressly understood that my invention is to be broadly construed within the full spirit and scope of the appended claims.

What I claim is:

1. The method of removing entrapped contaminants from an already fused matrix of solid or hollow glass fibers, comprising the following steps to be performed after fusing and subsequent cooling of the matrix:

enclosing the matrix in a chamber for confining microwave energy;

subjecting the matrix in the chamber to microwave energy radiation to heat the entrapped contaminants and remove them from the matrix by outgassing without substantially heating the glass fibers; and removing the gases from the chamber.

* * * * *